Figures 1, 2:
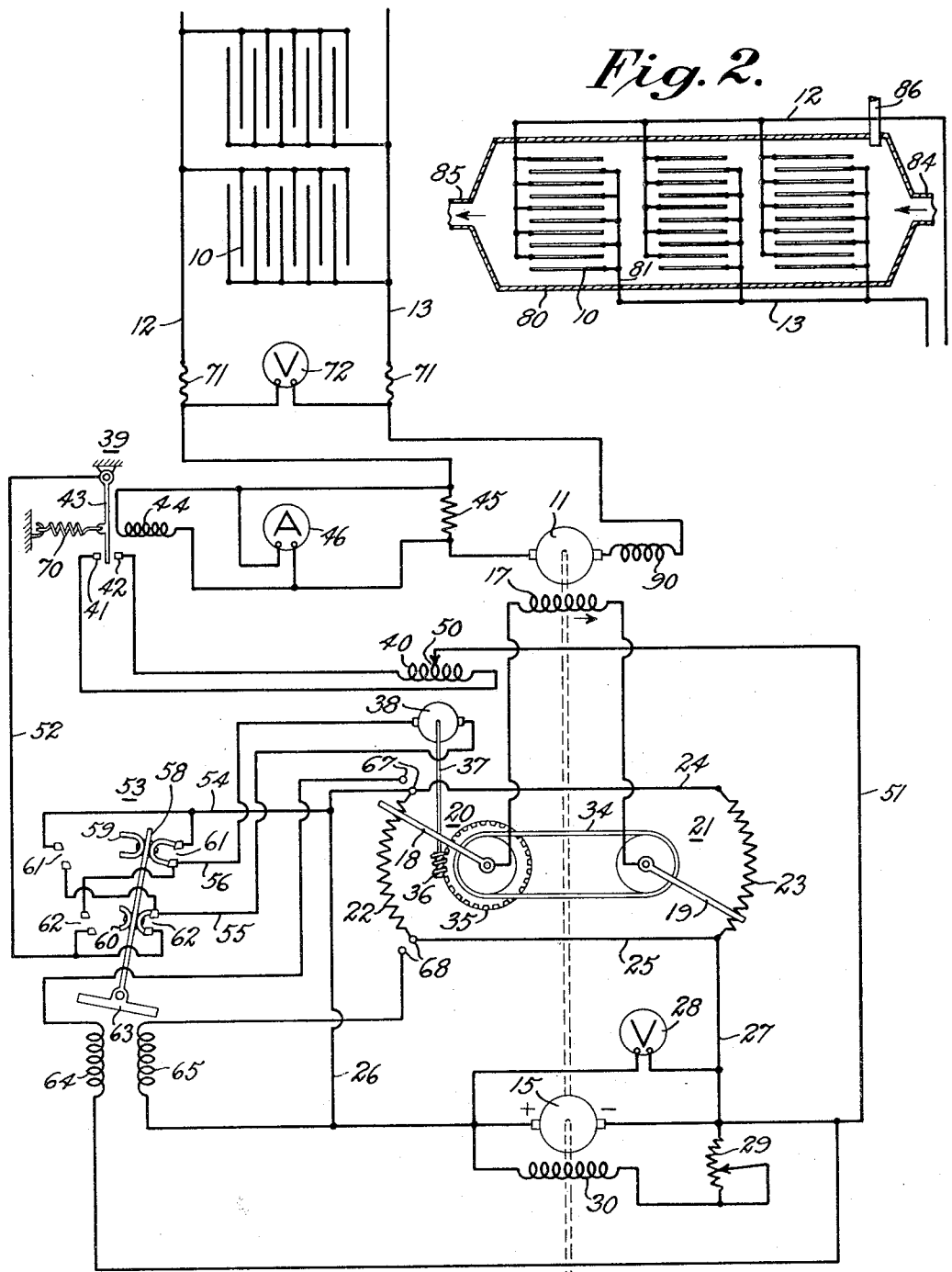

April 24, 1934. C. E. BONINE 1,956,411
APPARATUS FOR AND METHOD OF TREATING LIQUIDS
Filed Nov. 25, 1931

INVENTOR
Charles E. Bonine
BY
Wm. J. Hedlund
his ATTORNEY

Patented Apr. 24, 1934

1,956,411

UNITED STATES PATENT OFFICE 1,956,411

APPARATUS FOR AND METHOD OF TREATING LIQUIDS

Charles E. Bonine, Melrose Park, Pa., assignor, by mesne assignments, to Underpinning & Foundation Company, Inc., New York, N. Y., a corporation of New York Application November 25, 1931, Serial No. 577,184

20 Claims. (Cl. 204—25)

This invention relates to the electrochemical treatment of liquids and more particularly to an automatic current control for maintaining predetermined operating conditions in cells used in the electrochemical treatment of liquids to effect chemical changes in the liquids or in materials dissolved or suspended therein.

In the electrochemical treatment of liquids, an electric current is passed therethrough either with or without the use of a chemical reagent and the chemical or electrochemical action is utilized to produce the desired chemical change or for example to produce a condition within the liquid which hastens the separation and coagulation of the undesired materials and facilitates their removal by sedimentation or filtration. Typical processes of this type and means by which they may be carried out are disclosed in the U. S. Patents to Landreth No. 1,222,637 dated April 17, 1917 and No. 1,139,773 dated May 18, 1915.

In the normal operation of cells of the above character using iron electrodes in a causticized or alkaline solution, polarization of the electrodes occurs due to continued passage of current in the same direction and may be accompanied by an accumulation of deposits on the positive plates or electrodes. Various means such as scrapers may be employed for removing the deposits and agitating the liquid whereby the accumulations and the polarization of the electrodes are retarded. Even when these precautions are taken, however, the back electromotive force due to polarization, and the resistance of the cell due to the accumulations of material around the electrodes thereof, cause a gradual reduction in the amount of current flow. This may be compensated for by increasing the voltage applied to the cell in an effort to maintain the current flow substantially constant. The voltage required to maintain this current, however, eventually increases to an abnormally high value and prevents the continued operation of the cell in the above manner.

When the voltage reaches the above mentioned high value, the direction of the current may be reversed thereby reversing the polarity of the electrodes and serving automatically to depolarize the cell and to remove the accumulation from the electrodes. When the voltage is thus reversed, a discharge takes place due to the depolarization and thereafter the accumulated coating on the positive plate is removed by the hydrogen which is liberated on said plates owing to their becoming negative on reversing. The current through the cell can then be built up to the desired value until the conditions arise which require another current reversal.

In accordance with the present invention, automatic means are provided for so regulating the voltage supplied to the cells that the current is maintained substantially constant as the resistance and polarization of the cells increases and automatic means are provided for reversing the polarity of the cells when the voltage required to produce this current reaches an abnormally high value. This automatic control is effected directly from the intensity and the direction of current flow within the cells and the system is so devised that practically indefinite operation of the cells is permitted without manual attention.

Various objects, features and advantages of the present invention will be apparent from the following description taken in connection with the accompanying drawing, in which;

Fig. 1 is a diagrammatic representation of the current control system constructed in accordance with the present invention and, Fig. 2 is a diagrammatic view of one type of cell to which the current regulating system may be applied.

In the various figures of the drawing, similar parts are designated by similar reference numerals. Although certain specific terms are used for convenience as applied to various elements of the invention, it is to be understood that these terms are to be given as broad an interpretation as the art will permit.

Referring to the drawing more in detail, the invention discloses a bank of electrolytic cells 10 through which current is passed from generator 11 through bus bars 12 and 13. Generator 11 together with a shunt wound exciter 15 is driven by motor 16 which is operated by any available source of current supply, as for example, from a three phase alternating current line.

Field 17 of generator 11 is connected through movable arms 18 and 19 of potentiometers 20 and 21, respectively, to resistances 22 and 23. Said resistances are connected in parallel by lines 24 and 25 and are supplied with current from exciter 15 to which they are connected by lines 26 and 27. A voltmeter 28 may be provided across exciter 15. The voltage of the exciter can be controlled by varying resistance 29 which is inserted in circuit with the shunt field 30.

Arms 18 and 19 of potentiometers 20 and 21 are mechanically interconnected as by chain 34 for simultaneous movement. Associated with one of said arms is a toothed gear 35 which cooperates with a worm gear 36 driven by a suitable shaft 37 which is operated by a control motor 38. Control motor 38 is provided with a split field 40, connected to contacts 41 and 42, which cooperate with the armature 43 of a relay 39. Winding 44 of said relay is connected across a resistance 45 which is inserted in series with the bus 12 through which the current is applied to the electrolytic cells 10. A millivoltmeter 46 may be connected across said resistance and may be calibrated to indicate the amount of current flow through the cells.

The center tap 50 of field 40 is connected by line 51 to one pole, for example the negative pole, of exciter 15. Armature 43 is connected by line 52 through reversing switch 53 and line 54 to line 26 which is connected to the opposite or positive pole of said exciter. The armature of control motor 38 is connected by leads 55 and 56 to reversing switch 53 which is so connected that armature 38 remains in series with field 40 but the direction of current therein may be reversed in accordance with the position of said switch. Said switch 53 includes a pivoted arm 58 having a plurality of contacts 59 and 60 mounted thereon which are adapted to engage stationary contacts 61 and 62 respectively when the switch arm is in either of its extreme positions. Said arm is operated by an armature 63 which cooperates with solenoids 64 and 65 which are selectively energized for purposes of current reversal in a manner to be pointed out.

For operating said solenoids 64 and 65, potentiometer 20 is provided at the ends of resistance 22 with cooperating contacts 67 and 68. Arm 18 carries a contact member, not shown, which engages said contacts 67 or 68 when the arm 18 is in either of its extreme positions and thereby completes the circuit from either the plus or minus poles of exciter 15 through solenoids 64 or 65 and back to the opposite pole of said exciter.

A suitable adjustable spring 70 is connected to armature 43 and opposes the pull of winding 44 for normally maintaining said armature in a neutral position when the circuit is operating normally. Fuses 71 may be inserted in bus bars 12 and 13 for protective purposes and voltmeter 72 may be connected thereacross for measuring the voltage applied to the cells.

In the operation of the above described system, starting with the elements in the position shown in the diagram, a current flows in the direction of the arrow through field 17 by reason of the fact that arms 18 and 19 receive positive and negative potentials respectively due to their positions on resistances 22 and 23. It will be noted that when the positions of said arms are reversed due to counter-clockwise rotation of gear 35, a positive potential will be applied to arm 19 and a negative potential to arm 18 and the direction of current through field 17 will be reversed. When said arms are in midposition, that is in engagement with the center of resistances 22 and 23 respectively, the same potential will be applied to both of the arms and no current will flow through field 17. In intermediate positions, the direction and value of the potential applied to said field will vary between the above limits.

Assuming that the system is operating normally with the predetermined amount of current passing through resistance 45 and through the cells 10, the voltage applied to winding 44 due to the voltage drop in said resistance will be just sufficient to balance the torque of spring 70 and to maintain armature 43 in its central position thereby breaking the circuit to field 40 of control motor 38. If, however, the current passing through the cells drops below the above predetermined value, the voltage across winding 44 will be reduced and spring 70 will pull armature 43 against contact 41 thereby completing a circuit through the right hand side of field 40 and causing the motor 38 to operate in such a direction that clockwise movement of gear 35 is obtained and the voltage applied to the field 17 of generator 11 is correspondingly increased until the predetermined amount of current again flows through resistance 45. When this occurs relay 39 will again break the circuit through contact 41 and motor 38 will come to rest.

If, on the other hand, the value of the current through resistance 45 increases, winding 44 will attract armature 43 with sufficient force to close contact 42 and complete the circuit through the left hand side of field 40 and to thereby cause motor 38 to operate in such a direction as to cause counter-clockwise movement of gear 35 whereby the corresponding movement of arms 18 and 19 takes place and the voltage applied to the field 17 of generator 11 is decreased until the current passing through resistance 45 is brought to its normal value.

The above described operation automatically serves to maintain a constant predetermined value of current in a given direction through cells 10. However, when the resistance of the cells has reached a value such that the maximum voltage applied by generator 11 is not sufficient to maintain said current, the arm 18 of potentiometer 20 will have reached its extreme position, for example the extreme upper position, and contacts 67 will have been closed by the cooperating contacts on arm 18. This completes the circuit through solenoid 64 and thereby operates reversing switch 53 and causes the arm 58 to move to its opposite position and to reverse the direction of current through the armature of motor 38. When this occurs, the direction of rotation of said motor is reversed and gear 35 is rotated in counter-clockwise direction with corresponding movement of arms 18 and 19, thereby first reducing the excitation of generator 11 to zero when the arms are in their central position and thereafter gradually increasing the excitation in the reverse direction until a sufficient amount of current flows through resistance 45 to again operate relay 39 and open contact 41. When the above mentioned reversal takes place, the cells at first discharge due to depolarization and thereafter the accumulations are removed from the former positive plates or anodes which have on reversal become the cathodes. Thereafter, the device will operate to maintain the constant predetermined amount of current in the opposite direction through cells 10 until the above mentioned conditions have been reversed and arm 18 has reached its extreme lower position thereby closing contacts 68 and energizing solenoid 65 which again operates the reversing switch 53.

In referring to the above, it will be noted that the above operations will be repeated indefinitely as long as the cells remain in operation and that the current will at all times be maintained at a constant value with automatic reversals when the polarization and the resistance of the cells becomes such that reversal is necessary.

Generator 11 may be provided with an interpole or commutating winding 90 for assuring sparkless commutation under all operating conditions. The generator is called upon to deliver maximum current at all times and this current may flow in either direction depending upon the excitation of field 17. During the transfer period, when the cells are undergoing depolarization, the current flowing through the armature will be that discharged from the cells and this discharge will in fact take place while the generator is supplied with reduced or zero field excitation. The interpole winding accordingly becomes particularly useful in providing the necessary commutating field to give sparkless commutation.

Referring to Figure 2, one type of cell to which the above system is applicable is diagrammatically illustrated. Said cell comprises a closed insulating casing 80 which carries a plurality of banks 10 of electrodes which are interleaved and insulated from one another to provide the anodes and cathodes respectively, above referred to. The anodes of each bank may be connected together as by wires 81 and the cathodes may be independently connected together as by wires 82 which may be associated with bus bars 13 and 12 respectively. It will be evident that any desired number of banks 10 may be employed, depending upon the desired capacity of the completed cell. The arrangement is such that liquid may be applied to the cell through pipe 84 and passes as a flowing stream of liquid between the electrodes and is discharged through pipe 85. The electrodes of each bank are preferably arranged to receive a parallel flow of liquid. A suitable reagent may be introduced into the liquid either before or during its passage through the cell, as by pipe 86, for assisting the operation. Various reagents may be employed for this purpose such for example as calcium, sodium or potassium hydroxide or any reagent capable of producing free hydroxyl ions. The reagent is used in such quantity that the liquid contains free alkali and nascent oxygen is produced which causes oxidation of certain organic and inorganic materials suspended or dissolved in liquid as more fully described in the above mentioned patents to Landreth the disclosures of which are to be considered as incorporated herein for the purpose of disclosing the complete system for treating liquids. The electric current passing through the flowing liquid produces an electrochemical action which may or may not be assisted by the chemical action of reagents and which produces a condition within the liquid such that the undesired materials are rendered harmless and may be subsequently separated from the liquid by sedimentation or filtration.

Although the invention has been described as applying to a particular system, it is to be understood that it is not limited thereto but may be applied to various other uses as will be apparent to a person skilled in the art. The above description is given for the purpose of illustration only.

What is claimed is:

1. The method of treating liquids electrolytically which comprises passing current through said liquid and utilizing the strength of said current for automatically controlling the applied voltage in such relationship thereto that a substantially constant current is obtained through said liquid until an abnormal voltage is required therefor and utilizing such abnormal voltage conditions for reversing the direction of said current.

2. The method of treating liquids which comprises passing said liquid in a flowing stream through an electrolytic cell, applying a predetermined voltage to said cell whereby a current is caused to flow therethrough and utilizing the strength of said current for varying said voltage so as to maintain said current constant until an abnormal voltage is required therefor and utilizing said abnormal voltage for automatically effecting a reversal of said current whereby the polarity of said cell is reversed and depolarization thereof is automatically accomplished.

3. The method of treating liquids which comprises passing said liquid between the electrodes of an electrolytic cell, applying a voltage to said cell adapted to pass a given current through said liquid utilizing the changes in said current for controlling said voltage in such manner as to maintain a substantially constant current through said liquid, utilizing abnormal voltage conditions for reversing the direction of said voltage and thereafter utilizing the strength of current for so controlling said voltage as to maintain a substantially constant current in the reverse direction.

4. The method of treating liquids which comprises passing said liquid through an electrolytic cell, passing a current through the liquid in said cell and utilizing the decrease in current as the resistance of said cell is increased due to polarization and accumulations on the electrodes thereof for increasing the voltage of the current applied thereto whereby said current is maintained substantially constant.

5. The method of treating liquids which comprises passing said liquid through an electrolytic cell, passing a current through the liquid in said cell and utilizing the decrease in current as the resistance of said cell is increased due to polarization and accumulations on the electrodes thereof for increasing the voltage of the current applied thereto whereby said current is maintained substantially constant until an abnormal voltage is required therefor, thereafter utilizing the abnormal voltage conditions for reversing the polarity of said cell whereby said cell is automatically discharged and the accumulations removed, and maintaining said current substantially constant in the new direction until an abnormal voltage is again required and thereafter repeating the above steps.

6. An apparatus for treating and purifying sewage and the like which comprises an electrolytic cell having electrodes, means for passing said sewage through said cell in a flowing stream, means for passing an electric current through the liquid in said cell, regulating means for controlling the voltage of said electric current means for operating said regulating means to maintain a constant current and for removing accumulations from said electrodes.

7. An apparatus for the purification of liquids comprising an electrolytic cell, means for applying said liquid thereto, means for passing an electric current through the liquid in said cell, regulating means for controlling said current, means operable in accordance with the value of said current for operating said regulating means whereby the voltage applied to said cell is increased as the internal resistance thereof increases during use due to polarization and accumulations on the electrodes, and means controlled by the voltage conditions for reversing the polarity of said cell when an abnormal voltage is required to maintain said current whereby said cell is automatically depolarized and discharged and means for thereafter maintaining a constant current in the new direction and for repeating said operations when the above mentioned conditions arise.

8. An apparatus for the purification of liquids comprising an electrolytic cell, means for applying said liquid thereto, a generator for passing an electric current through the liquid in said cell, a field for exciting said generator, a regulating device for controlling the voltage applied to said field, means for operating said regulating device in accordance with the current in said cell for changing said field so as to maintain said current substantially constant, and means for reversing the field excitation when conditions are such due to polarization and accumulations on the electrodes of the cell that an abnormal voltage is required to maintain said current therein.

9. An apparatus for the purification of liquids comprising an electrolytic cell, means for applying said liquid thereto, means for passing an electric current through the liquid in said cell comprising a generator having a field winding, means for controlling excitation of said field in accordance with the current value in said cell and thereby maintaining a substantially constant current therein until the condition of said cell becomes such that an abnormal excitation is required and means operable upon said abnormal conditions for reversing the direction of said excitation and thereby reversing the polarity of said cell whereby said cell becomes automatically depolarized and is continued in operation with the reversed polarity.

10. An apparatus for treating liquids which comprises an electrolytic cell, means for applying said liquid thereto, a generator for passing an electric current through said liquid, a field for said generator and a potentiometer adapted to control the excitation of said field, means comprising a control motor for operating said potentiometer and a relay operable in accordance with the current intensity in said liquid for operating said control motor whereby said field excitation is varied in such manner as to maintain said current substantially constant.

11. An apparatus for treating liquids comprising an electrolytic cell, means for passing said liquid therethrough, a generator for applying a voltage thereto and causing an electric current to flow through said liquid, a field for said generator, a potentiometer associated with said field and adapted to control the excitation of said field from full excitation in a given direction to full excitation in the reverse direction, means controlled in accordance with the current flow in said liquid for operating said potentiometer so as to maintain said current substantially constant until the conditions are such that an abnormal excitation is required therefor and means operable upon said abnormal conditions for reversing the position of said potentiometer whereby the excitation of said generator is reversed and the polarity of said cell is likewise reversed.

12. An apparatus for treating liquids comprising an electrolytic cell, means for passing said liquid therethrough, a generator for applying a voltage to said cell whereby an electric current is passed through said liquid, a field associated with said generator, a potentiometer for controlling and reversing the field excitation, means comprising a control motor for operating said potentiometer, a relay operating in accordance with the strength of current in said cell for operating said motor and thereby controlling the position of said potentiometer and the strength of said field excitation, the arrangement being such that the current in said liquid is automatically maintained substantially constant until the conditions become such that an abnormal excitation is required therefor, and a reversing switch adapted to reverse the operation of said control motor and operable when said potentiometer is in either of its extreme positions whereby the field excitation is reversed and the polarity of said cell is reversed when said abnormal conditions arise.

13. In an apparatus for the electrochemical purification of liquids, a cell, means for passing said liquid therethrough, means for passing a predetermined electric current through said liquid comprising a generator having a field, a potentiometer for controlling the field excitation, a motor for operating said potentiometer, means for controlling the operation of said motor in accordance with the current passing through said liquid for thereby maintaining the excitation such that a constant current is obtained, means for reversing the polarity of said cell and means for effecting said reversal controlled in accordance with the voltage conditions in said cell whereby when excessive voltages are required due to polarization of said cell, reversal is automatically accomplished.

14. An apparatus for the electrochemical purification of liquids comprising a cell, means for passing said liquid therethrough and means for passing an electric current through the liquid in said cell comprising a supply circuit, a potentiometer having a pair of oppositely movable arms adapted to control the direction and strength of current in said circuit, said arms being so mechanically interconnected as to remain at opposite potentials on said potentiometer, the movement of said arms from one extreme position to the other serving to vary the potential applied to said circuit from full potential in one direction to full potential in the reverse direction.

15. An apparatus for the electrochemical purification of liquids comprising a cell, means for passing said liquid therethrough and means for passing an electric current through the liquid in said cell comprising a supply circuit, a potentiometer having a pair of oppositely movable arms adapted to control the direction and strength of current in said circuit, said arms being so mechanically interconnected as to remain at opposite potentials on said potentiometer, the movement of said arms from one extreme position to the other serving to vary the potential applied to said circuit from full potential in one direction to full potential in the reverse direction, means for effecting movement of said arms, and means initiated when one of said arms reaches its extreme position for causing reverse movement thereof for changing the polarity of said circuit.

16. An apparatus for the electrochemical treatment of liquids comprising an electrolytic cell, means for passing said liquid therethrough, and means for passing an electric current through the liquid in said cell comprising a supply circuit, a pair of potentiometers connected in parallel, the arms of said potentiometers being adapted to control the strength and direction of current in said circuit, said arms being mechanically interconnected for movement in opposite directions with respect to the polarity of said potentiometers, a worm and gear associated with one of said arms and a control motor for operating said worm and thereby controlling the position of said arms.

17. An apparatus for the electrochemical treatment of liquids comprising an electrolytic cell, means for passing said liquid therethrough and means for passing an electric current through the liquid in said cell comprising a supply circuit, a pair of potentiometers connected in parallel, the arms of said potentiometers being adapted to control the strength and direction of current in said circuit, said arms being mechanically interconnected for movement in opposite directions with respect to the polarity of said potentiometers, a worm and gear associated with one of said arms and a control motor for operating said worm and thereby controlling the position of said arms, and means initiated when said arms reach their extreme positions for reversing the operation of said control motor.

18. An apparatus for the electrochemical treatment of liquids comprising an electrolytic cell, means for passing said liquid therethrough, and means for passing an electric current through the liquid in said cell comprising a supply circuit, a generator for applying a voltage thereto, said generator having an exciting winding, a potentiometer having a pair of mechanically interconnected arms adapted to remain at opposite polarities on said potentiometer and connected respectively across said winding, means controlled by the current in said liquid for effecting movement of said arms so as to vary the excitation of said generator and maintain said current constant and means initiated when said arms reach their extreme positions for causing reverse movement thereof whereby the polarity of said exciting winding is reversed.

19. An apparatus for treating and purifying sewage and the like which comprises an electrolytic cell, means for passing sewage therethrough in a flowing stream, means for passing an electric current through the sewage in said cell, and current controlled means for maintaining a substantially constant current through said cell and for reversing the current.

20. The method of treating liquids electrolytically, which comprises passing current through said liquid, varying the applied voltage automatically in accordance with changes in resistance to passage of the current in such relationship thereto that a substantially constant current through said liquid is obtained and utilizing abnormal voltage conditions for reversing the direction of said current.

CHARLES E. BONINE.